(12) United States Patent
Matsui

(10) Patent No.: US 11,883,929 B2
(45) Date of Patent: Jan. 30, 2024

(54) ABRASIVE PEENING APPARATUS AND ABRASIVE PEENING METHOD

(71) Applicant: SUGINO MACHINE LIMITED, Uozu (JP)

(72) Inventor: Taiki Matsui, Uozu (JP)

(73) Assignee: SUGINO MACHINE LIMITED, Uozu (JP)

(*) Notice: Subject to any disclaimer, the term of this patent is extended or adjusted under 35 U.S.C. 154(b) by 215 days.

(21) Appl. No.: 17/375,287

(22) Filed: Jul. 14, 2021

(65) Prior Publication Data
US 2022/0063058 A1 Mar. 3, 2022

(30) Foreign Application Priority Data

Sep. 2, 2020 (JP) .................................. 2020-147731

(51) Int. Cl.
*B24C 1/10* (2006.01)
*B24C 3/12* (2006.01)
(Continued)

(52) U.S. Cl.
CPC .............. *B24C 1/10* (2013.01); *B24B 31/003* (2013.01); *B24C 3/065* (2013.01); *B24C 3/12* (2013.01); *B24C 5/02* (2013.01); *B24C 7/0007* (2013.01)

(58) Field of Classification Search
CPC ....... B24B 31/006; B24B 31/12; B24B 31/14; B24B 31/16; B24B 57/02; B24B 57/04;
(Continued)

(56) References Cited

U.S. PATENT DOCUMENTS 3,484,995 A * 12/1969 Gordon ................... B24C 1/003
 451/39
4,854,090 A 8/1989 Heron et al.
(Continued)

FOREIGN PATENT DOCUMENTS

EP 2785494 B1 11/2015
EP 3666460 A1 6/2020
(Continued)

OTHER PUBLICATIONS

Soyama, H., Sanders, D., "Use of an Abrasive Water Cavitating Jet and Peening Process to Improve the Fatigue Strength of Titanium Alloy 6Al-4V Manufactured by the Electron Beam Powder Bed Melting (EBPB) Additive Manufacturing Method", JOM 71(12), pp. 4311-4318, 2019.

(Continued)

*Primary Examiner* — Eileen P Morgan
(74) *Attorney, Agent, or Firm* — United IP Counselors, LLC

(57) ABSTRACT

An apparatus capable of efficiently performing a metal surface processing. The abrasive peening apparatus includes a processing tank storing abrasive particles and peening liquid, and including a bottom portion in which a workpiece is immersed in the peening liquid; a dispensing chamber having a plurality of recesses on an upper surface, and disposed in the bottom portion to dispense the peening liquid; a stirring nozzle disposed at a center of the recess directing vertically upward and connected to the dispensing chamber to eject the peening liquid; a peening nozzle immersed inside the processing tank to eject the peening liquid toward the workpiece; and a moving device moving the peening nozzle relative to the workpiece.

16 Claims, 7 Drawing Sheets

(51) Int. Cl.
*B24C 5/04* (2006.01)
*B24C 9/00* (2006.01)
*B24B 57/02* (2006.01)
*B24C 3/04* (2006.01)
*B24C 7/00* (2006.01)
*B24B 31/00* (2006.01)
*B24C 5/02* (2006.01)
*B24C 3/06* (2006.01)

(58) Field of Classification Search
CPC ........... B24C 1/08; B24C 1/083; B24C 1/086; B24C 1/10; B24C 3/04; B24C 3/06; B24C 3/065; B24C 3/12; B24C 3/22; B24C 5/02; B24C 5/04; B24C 7/0007; B24C 9/00; B24C 9/003
USPC ........ 451/37, 38, 40, 60, 65, 66, 74, 75, 84, 451/85, 87, 88, 89, 99, 100, 101, 102, 451/104, 106, 113, 326
See application file for complete search history.

(56) References Cited

U.S. PATENT DOCUMENTS

| | | | | |
|---|---|---|---|---|
| 5,460,566 A * | 10/1995 | Trahan | ................... | B24B 31/06 451/328 |
| 5,593,339 A * | 1/1997 | Yam | .......................... | B08B 7/02 451/36 |
| 6,406,356 B1 * | 6/2002 | Brooks | ................. | B24B 31/003 451/36 |
| 6,855,208 B1 * | 2/2005 | Soyama | ................... | B24C 1/10 134/16 |
| 7,455,573 B2 * | 11/2008 | Huang | ...................... | B24C 5/00 451/5 |
| 11,633,835 B2 * | 4/2023 | Sanders | .................... | B24C 1/08 451/87 |
| 2005/0103362 A1 * | 5/2005 | Soyama | .................... | B24C 1/10 134/198 |
| 2006/0128275 A1 * | 6/2006 | Hisata | ................... | B24C 11/005 451/38 |
| 2008/0038991 A1 * | 2/2008 | Hunter | .................. | B24C 11/005 451/87 |
| 2016/0008950 A1 * | 1/2016 | Quan | ...................... | B21B 45/08 451/75 |
| 2019/0061103 A1 * | 2/2019 | Sanders | ................ | B05B 7/1463 |
| 2020/0189068 A1 * | 6/2020 | Sanders | .................... | B01F 25/30 |
| 2021/0008808 A1 * | 1/2021 | Cudzilo | .................... | B24C 1/08 |
| 2022/0161387 A1 * | 5/2022 | Yeo | .......................... | B24C 5/005 |
| 2023/0081193 A1 * | 3/2023 | Matsui | ...................... | B24C 3/06 72/53 |
| 2023/0173641 A1 * | 6/2023 | Sanders | ................ | B24C 7/0007 451/113 |

FOREIGN PATENT DOCUMENTS

KR 10-2018-0122143 A 11/2018
SU 397324 A1 9/1973

OTHER PUBLICATIONS

Extended European Search Report dated Jan. 18, 2022 in a corresponding European patent application No. 21186312.1. (9 pages).

* cited by examiner

ABRASIVE PEENING APPARATUS AND ABRASIVE PEENING METHOD

CROSS-REFERENCE TO RELATED APPLICATIONS

This application claims the benefit of priority to Japanese Patent Application No. 2020-147731, filed on Sep. 2, 2020, the entire contents of which are hereby incorporated by reference.

BACKGROUND

1. Technical Field

The present invention relates to an abrasive peening apparatus and an abrasive peening method.

2. Description of the Background

A method of improving a surface roughness of samples such as metallic materials produced by additive manufacturing has been proposed. (H. Soyama and D. Sanders, Use of an Abrasive Water Cavitating Jet and Peening Process to Improve the Fatigue Strength of Titanium Alloy 6A1-4V Manufactured by the Electron Beam Powder Bed Melting (EBPB) Additive Manufacturing Method, JOM 71 (12), 4311-4318 (2019), hereinafter referred to as Non-Patent Literature 1). In the method of Non-Patent Literature 1, a sample is fixed in a tank containing an abrasive and water. Then, the water pressurized by a plunger pump is ejected onto the sample from a nozzle which is immersed in the tank and directed downward. This reduces the residual stress on the surface of the sample.

BRIEF SUMMARY

An object of the present invention is to provide an apparatus and a method capable of efficiently performing a metal surface processing.

A first aspect of the present invention provides an abrasive peening apparatus, including:
- a processing tank configured to store abrasive particles and peening liquid, the processing tank including a bottom portion in which a workpiece is immersed in the peening liquid;
- a dispensing chamber having a plurality of recesses on an upper surface, the dispensing chamber disposed in the bottom portion, the dispensing chamber configured to dispense the peening liquid;
- a stirring nozzle disposed at a center of the recess directing vertically upward, the stirring nozzle connected to the dispensing chamber to eject the peening liquid;
- a peening nozzle immersed inside the processing tank, the peening nozzle configured to eject the peening liquid toward the workpiece; and
- a moving device configured to move the peening nozzle relative to the workpiece.

A second aspect of the present invention provides an abrasive peening method, including:
- putting abrasive particles into a processing tank;
- ejecting peening liquid from an internal outlet disposed inside each of stirring nozzles, the stirring nozzles evenly arranged in a lower portion of the processing tank;
- sucking suspension of the peening liquid and the abrasive particles floating inside a recess around the stirring nozzle into the stirring nozzle;
- blowing up the sucked suspension from an outlet locate on an upper portion of the stirring nozzle toward inside the processing tank to float the abrasive particles;
- ejecting the peening liquid from a peening nozzle immersed in the peening liquid that is stored in the processing tank toward a surface of a workpiece disposed in a bottom portion of the processing tank;
- peening the surface of the workpiece with the abrasive particles on a flow of ejected peening liquid colliding with the workpiece; and
- applying residual stress to the surface of the workpiece with cavity generated by the ejected peening liquid colliding with the workpiece.

The peening liquid is, for example, water. The peening liquid does not contain a surfactant, and may be an aqueous solution containing a rust inhibitor. The rust inhibitor is, for example, an amine compound which is a primary amine, a secondary amine, or a tertiary amine.

The abrasive particles are, for example, alumina, or garnet.

As viewed from above, the recesses are arranged substantially uniformly. As viewed from above, the recesses are arranged, for example, in a lattice. As viewed from above, the recesses may be arranged at the vertices of the triangle when the equilateral triangles of equal length are laid.

Preferably, the processing tank includes an enlarged portion disposed in an upper portion of the processing tank. The horizontal cross-sectional area of the enlarged portion is larger than the horizontal cross-sectional area of the bottom of the processing tank.

An overflow of the peening liquid in the processing tank is suppressed by the baffle plate. The circumferential flow of the peening liquid in the processing tank is suppressed by the vertical baffle plate. The abrasive particles flow in the processing tank by the flow of the peening liquid. The cavity flows in the processing tank by the flow of the peening liquid. As a result, the baffle plate or the vertical baffle plate restrains the abrasive particles and cavities from floating up and circulating.

The peening liquid is supplied from below through the stirring nozzle, and discharged from the upper overflow port. When the peening liquid rises, the superficial velocity decreases in the enlarged portion located in the upper part of the processing tank, and the settling of the abrasive particles is promoted.

DETAILED DESCRIPTION

First Embodiment

Figure 1:
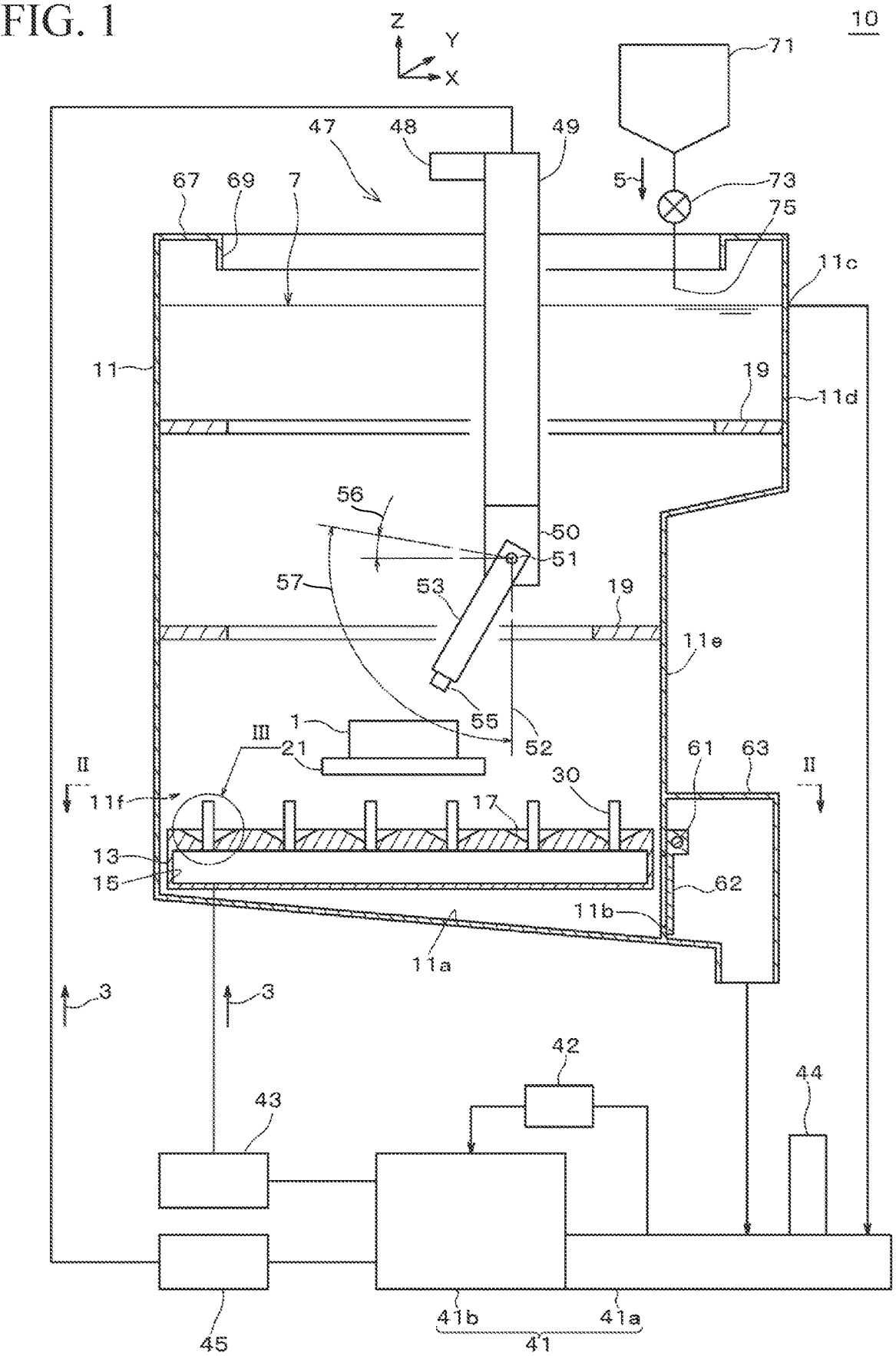
FIG. 1 is a longitudinal sectional view of an abrasive peening apparatus of a first embodiment.

As shown in FIG. 1, an abrasive peening apparatus 10 of the present embodiment includes a processing tank 11, a dispensing block 13, a recess 17, a stirring nozzle 30, a table 21, a moving device 47, a peening nozzle 55, a drain valve 62, a duct 63, a hopper 71, a tank 41, a stirring pump 43, and a peening pump 45.

The processing tank 11 includes a bottom surface 11a, a drain port 11b, an overflow port 11c, an enlarged portion 11d, a trunk portion 11e, and a bottom portion 11f. The processing tank 11 is an open tank having a prismatic shape. The processing tank 11 has, for example, a bottom surface of 1 m square to 1.5 m square and a height of 1 m to 2 m.

The bottom surface 11a is inclined. The bottom portion 11f is a portion near the bottom of the processing tank 11. The drain port 11b is located at the bottom portion 11f and at a deep position of the bottom surface 11a when viewed from above. The drain port 11b may be disposed on a side wall of the processing tank 11. The drain port 11b is, for example, a rectangular opening.

The enlarged portion 11d is located at an upper part of the processing tank 11. The height of the enlarged portion 11d may occupy 30% to 60% of the height of the processing tank 11. The enlarged portion 11d expands the cross section of the processing tank 11. For example, in the enlarged portion 11d, one wall surface of the processing tank 11 protrudes outward. The overflow port 11c is located at an upper part of the processing tank 11. For example, the overflow port 11c is located in the enlarged portion 11d.

The processing tank 11 stores abrasive particles 5 and peening liquid 3. The peening liquid 3 has a liquid level 7 that is determined by the height of the overflow port 11c. The peening liquid 3 is, for example, well water, industrial water, tap water, or an aqueous solution containing a rust inhibitor. The industrial water is used by filtration. The rust inhibitor is, for example, an amine compound. The abrasive particles 5 are, for example, alumina having a particle size F140 in ISO8486-1 (particle size of the grinding wheel abrasive). The abrasive particles 5 having, for example, 8 ($kg/m^2$)~160 ($kg/m^2$) by mass per unit area of the cross-sectional area of the bottom portion 11f are put.

The dispensing block 13 is a rectangular hollow container having a dispensing chamber 15 inside. The dispensing chamber 15 occupies substantially the entire area in the cross-section of the dispensing block 13. The dispensing chamber 15 is arranged below the dispensing block 13. The top plate 13a of the dispensing block 13 has a thickness 24. The dispensing chambers 15 may form one large space by connecting round holes arranged in a lateral and width direction to each other.

The table 21 is arranged near the center in the cross section of the bottom portion 11f. A workpiece 1 is fixed to the table 21.

The processing tank 11 may have a baffle plate 19. The baffle plate 19 is disposed on the trunk portion 11e or the enlarged portion 11d. The baffle plate 19 extends horizontally. The baffle plate 19 is preferably disposed so as to encircle the inner circumference of the processing tank 11. The baffle plate 19 is, for example, a flat plate. The baffle plate 19 may have a through hole. For example, the baffle plate 19 may have a mesh shape. A plurality of baffle plates 19 may be arranged in the vertical direction. The baffle plate 19 is preferably located above the level at which the majority of the abrasive particles 5 float. The baffle plate 19 is disposed above the table 21 and the workpiece 1.

The processing tank 11 may include a first folded back 67 and a second folded back 69. The first folded back 67 extends horizontally inside the upper end of the processing tank 11. The first folded back 67 is a flat plate. The first folded back 67 is provided on the entire circumference along the inner periphery of the upper end of the processing tank 11. The second folded back 69 is arranged at the inner end of the first folded back 67 by being folded downwards. The second folded back 69 is, for example, a vertical plane. The second folded back 69 is provided on the entire inner circumference of the first folded back 67.

The drain valve 62 is installed on the drain port 11b. The drain valve 62 is, for example, rotated by a cylinder (not shown) about a pin 61. The drain valve 62 opens or closes the drain port 11b.

The duct 63 is disposed outside the drain port 11b so as to surround the drain port 11b. The duct 63 is, for example, L-shaped. The duct 63 extends horizontally from the drain port 11b. The duct 63 flows out the abrasive particles 5 and the peening liquid 3 to the tank 41.

The tank 41 stores the peening liquid 3. The tank 41 includes a waste tank 41a, a clean tank 41b, a filter 42, and a discharge device 44. The duct 63 is connected to the waste tank 41a. The discharge device 44, which is, for example, a screw separator, is installed in the waste tank 41a. The discharge device 44 discharges the abrasive particles 5 accumulated inside the waste tank 41a. The clean tank 41b is connected to the waste tank 41a via the filter 42.

The filter 42, which includes a liquid pump, pumps up the peening liquid 3 in the waste tank 41a to filter and supply it to the clean tank 41b. The filter 42 is, for example, a cyclone filter, a cartridge filter, a magnet filter, or a paper filter. The filter 42 may include a cyclone filter and a cartridge filter connected in series. The overflow of the clean tank 41b returns to the waste tank 41a.

The hopper 71 stores the abrasive particles 5. The hopper 71 is connected to the processing tank 11 via a valve 73 and an inlet 75. Preferably, the inlet 75 is disposed above the liquid level 7.

The stirring pump 43 is, for example, a centrifugal pump. The stirring pump 43 is connected to the clean tank 41b and the dispensing chamber 15. The stirring pump 43 pumps the peening liquid 3 from the clean tank 41b and supplies the peening liquid 3 to the dispensing chamber 15.

Figure 2:
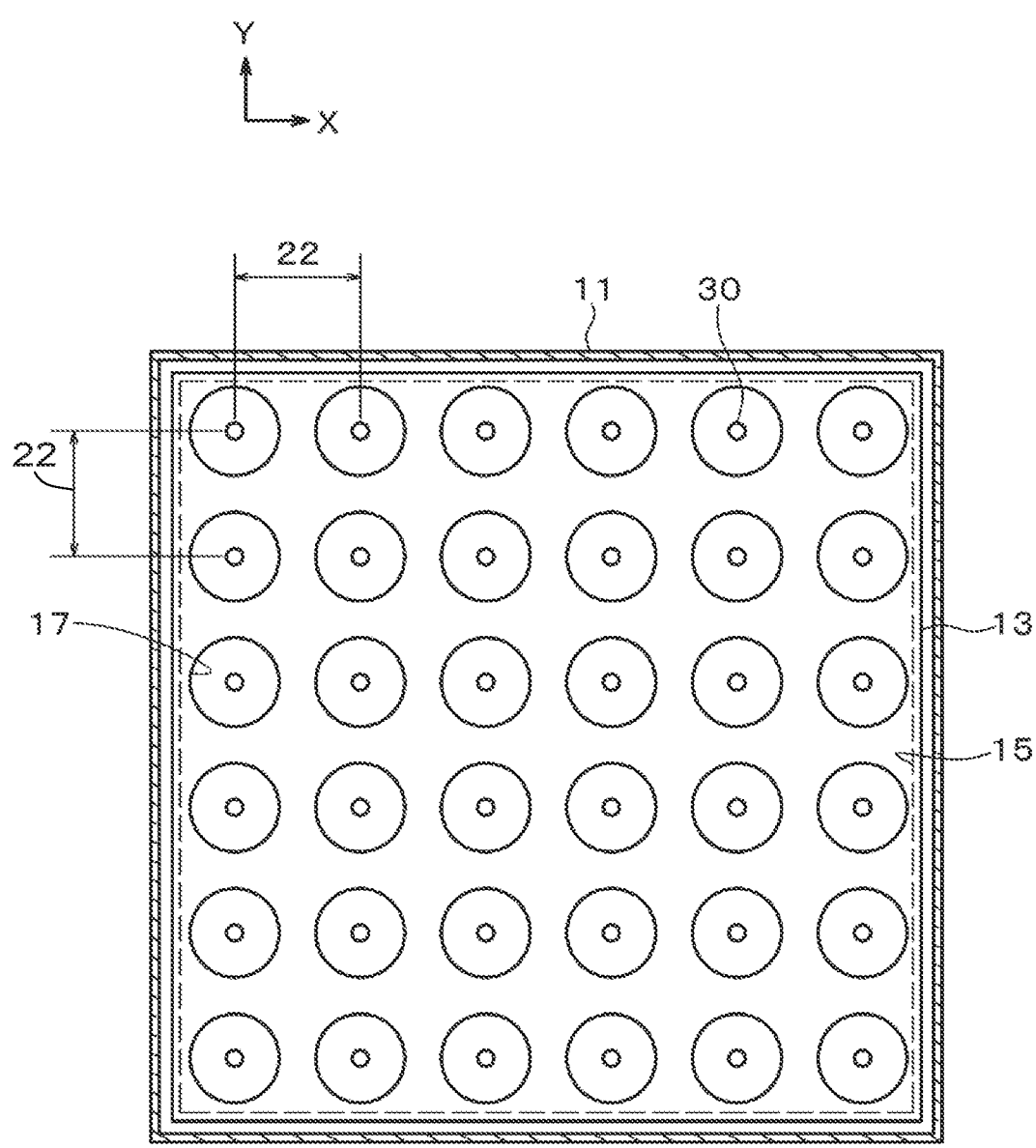
FIG. 2 is a cross-sectional view of II-II in FIG. 1.
Figure 3:
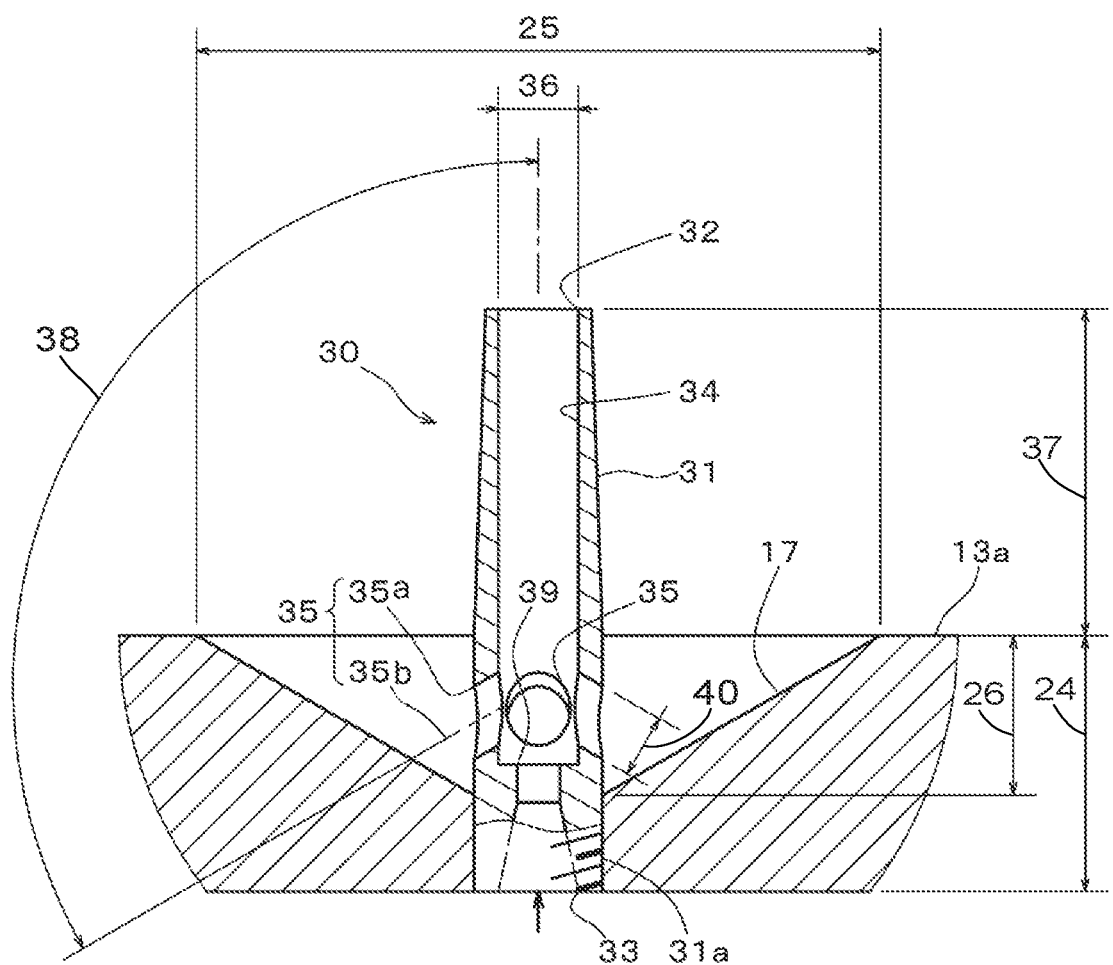
FIG. 3 is an enlarged view of part III in FIG. 1.

As shown in FIGS. 1 to 3, the plurality of recesses 17 are uniformly dispersed and arranged on the top plate 13a. For example, when viewed from above, the recesses 17 are arranged in a lattice shape with a space 22 therebetween. The recess 17 has a conical shape having a larger diameter toward an upper direction. As shown in FIG. 3, the recess 17 has a diameter 25 at the upper end that is larger than the height 26 of the recess 17. For example, the diameter 25 is 1.5 to 10 times the height 26.

As shown in FIG. 3, the stirring nozzle 30 includes a body 31, an outlet 32, a peening liquid inlet 33, an internal outlet 39, a passage 34, and an abrasive particle suction port 35. The body 31 is a substantially cylindrical shape extending in the vertical direction. The body 31 has a male screw 31a at the proximal end. The male screw 31a is screwed into the top plate 13a. The diameter of the outer peripheral surface of the body 31 becomes slightly smaller upward.

The inlet 33 is disposed at the proximal end of the body 31 in a downward direction. The internal outlet 39 is connected to the inlet 33. The internal outlet 39 has a smaller diameter than the passage 34. The internal outlet 39 is disposed on the upstream side around the suction port 35.

The outlet 32 is disposed upwardly on the upper end of the body 31. The outlet diameter 36 is, for example, 1 mm to 5 mm. The height 37 of the outlet 32 is, for example, four to ten times the outlet diameter 36. The passage 34, which connects the internal outlet 39 and the outlet 32, extends in the vertical direction. The passage 34 is substantially cylindrical. The passage 34 occupies most of the volume of the body 31.

The abrasive particle suction port 35 is disposed at the lower portion of the trunk portion of the body 31. The suction port 35 has an opening 35a, and an axis 35b. The suction port 35 penetrates the body 31 to connect from the opening 35a to the passage 34. The suction port 35 extends radially inwardly from the outer peripheral surface of the body 31. A plurality of suction ports 35 are evenly disposed in the circumferential direction of the body 31. For example, three to five (four in FIG. 3) suction ports 35 are arranged in the body 31.

The opening 35a is an opening of the suction port 35 disposed on the outer cylindrical surface of the body 31. The opening 35a is arranged inside the recess 17. The opening 35a has an opening diameter 40 that is substantially the same as the outlet diameter 36. Preferably, the opening 35a is located at the bottom of the recess 17. The axis 35b may be inclined upward as it is inwardly along the radial direction. For example, the angle 38 between the axis 35b and the center of the body 31 is 100 degrees to 120 degrees.

The peening liquid 3 flows from the dispensing chamber 15 into the inlet 33, and is ejected from the internal outlet 39 into the passage 34. At this time, the outer peripheral portion of the bottom of the passage 34 becomes negative pressure. Then, the abrasive particles 5 floating in the bottom portion 11f together with the peening liquid 3 in the processing tank 11 flow into the passage 34 from the suction port 35 as a suspension. The abrasive particles 5 and the peening liquid 3 sucked from the suction port 35 are mixed with the peening liquid 3 flowing in from the inlet 33, and are ejected into the processing tank 11 from the outlet 32. The abrasive particles 5 circulate between the bottom portion 11f and the stirring nozzle 30.

A superficial velocity V (m/s) is obtained by dividing a flow rate P (m³/s) of the peening liquid 3 ejected from the stirring nozzles 30 by the cross-sectional area of the trunk portion 11e. The superficial velocity V is set so that the fluid resistance received by the abrasive particles 5 from the peening liquid 3 is substantially the same as the difference between the gravity of the abrasive particles 5 and the buoyancy of the abrasive particles 5. As a result, the abrasive particles 5 float at the bottom portion 11f. The floating abrasive particles 5 are sucked by the stirring nozzle 30 and blown upward. The abrasive particles 5 are unevenly distributed at the lower portion of the processing tank 11. Preferably, the abrasive particles 5 are densely present up to slightly above the workpiece 1. In the enlarged portion 11d, the superficial velocity V decreases, and the sedimentation of the abrasive particles 5 is promoted.

The peening pump 45 is, for example, a piston pump. For example, the discharge pressure of the peening pump is 15 MPa to 80 MPa. The peening pump 45 connects the clean tank 41b and the peening nozzle 55. The peening pump 45 pumps the peening liquid 3 from the clean tank 41b, and supplies the peening liquid 3 to the peening nozzle 55.

As shown in FIG. 1, the moving device 47 includes a moving column 48, a quill 49, and a nozzle holder 53. The moving device 47 may include a rotatable head 50. The quill 49 includes slide having a round or square bar shape. The moving column 48 freely moves in the left-right direction X and the front-back direction Y. The feeder 49 freely moves the moving column 48 in the vertical direction Z.

The rotatable head 50 is disposed at a distal end of the feeder 49. The rotatable head 50 is rotatable about a C-axis 52 extending in the vertical direction. The nozzle holder 53 is installed in the distal end portion of the feeder 49 or the rotatable head 50. Preferably, the nozzle holder 53 is freely rotatable about an A-axis 51 extending horizontally. The nozzle holder 53 is rotatable in a stroke 57 of the A-axis 51. The nozzle holder 53 may be inclined by an angle 56 upward from the horizontal axis. The angle 56 is, for example, 0 to 20 degrees. The lower end of the A-axis 51 is a position where the nozzle holder 53 is directed vertically downward.

Figure 4:
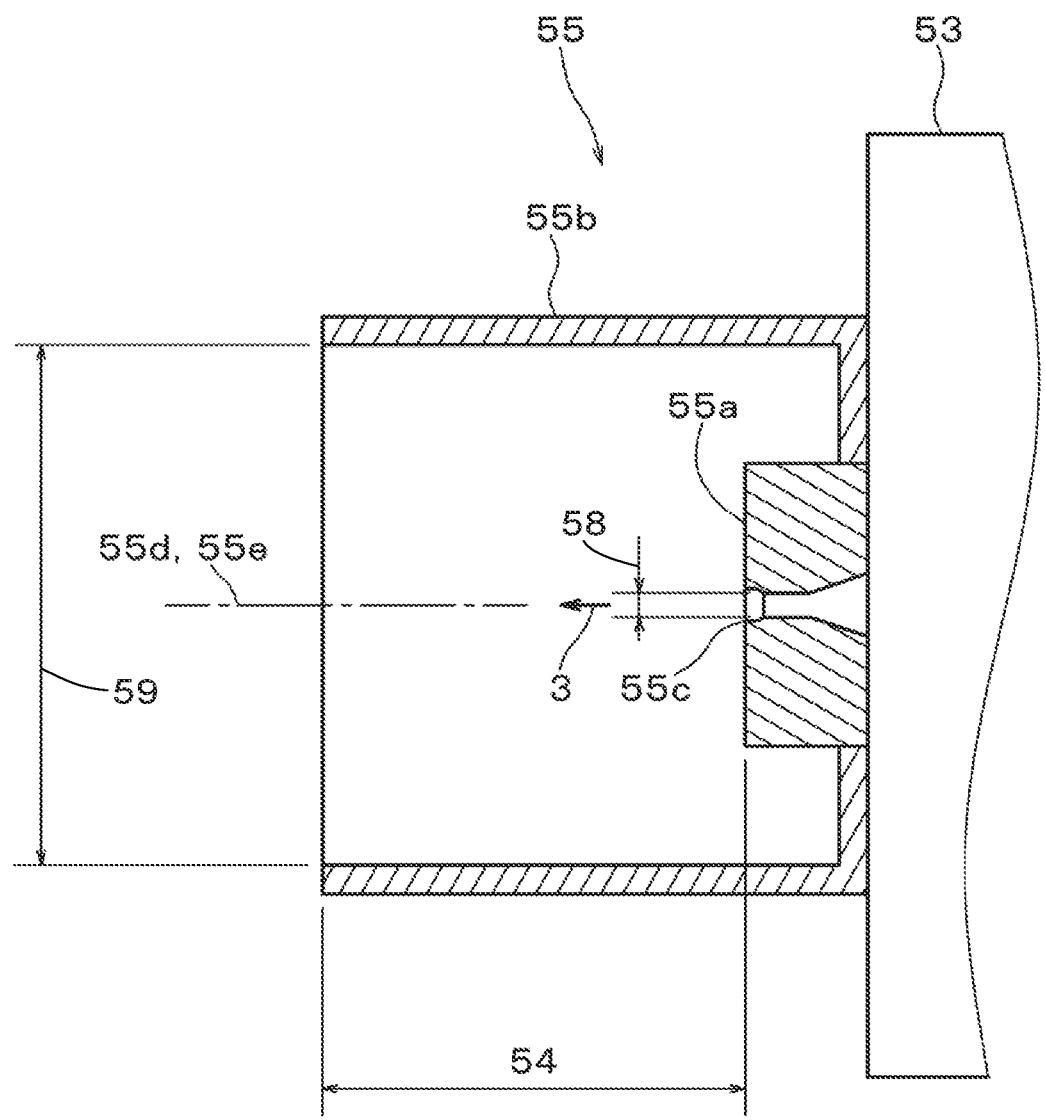
FIG. 4 is a longitudinal sectional view of a peening nozzle of the first embodiment.

As shown in FIG. 4, the peening nozzle 55 includes a nozzle tip 55a and a side wall 55b. The peening nozzle 55 is installed at the tip of the nozzle holder 53. The nozzle tip 55a is, for example, a flat spray nozzle. The nozzle tip 55a has an outlet 55c. The outlet diameter 58 of the peening nozzle 55 is, for example, 1 mm to 2 mm. The ejection axis 55d of the peening nozzle 55 extends in the longitudinal direction of the nozzle holder 53. The nozzle tip 55a ejects the peening liquid 3 so as to extend along the ejection plane 55e passing through the ejection axis 55d and the A-axis 51 from the outlet 55c.

The side wall 55b is, for example, a cylindrical wall surface around the ejection axis 55d. The inner diameter 59 of the side wall 55b is, for example, 15 to 20 times the outlet diameter 58. The height 54 of the side wall 55b is, for example, 5 to 10 times the outlet diameter 58.

The side wall 55b restricts the inflow of peening liquid 3 from the periphery of the outlet 55c. The peening liquid 3 from the outlet 55c is ejected into the inside of the side wall 55b to promote an occurrence of cavity by generating a vortex between a jet and the peening liquid 3 accumulated inside the side wall 55b.

A cavitation jet containing a lot of cavities ejected from the peening nozzle 55 gives a peening effect on the surface of the workpiece 1. Further, the abrasive particles 5 floating in the bottom portion 11f are entrained in the cavitation jet to collide with the surface of the workpiece 1. The abrasive particles 5 flow along the surface of the workpiece 1 and burnish the surface of the workpiece 1.

The cavitating jet collides with the surface of the workpiece 1 to change the flow along the surface of the workpiece 1. Some jet flows horizontally or upward. The abrasive particles 5 spray up along a jet that collides with the surface of the workpiece 1 and has a change of orientation. The baffle plate 19 obstructs the upward flow and stabilizes the flow inside the processing tank 11. Further, the cavity generated in the processing tank 11 moves on the flow of the peening liquid 3. As a result, the baffle plate 19 suppresses the rising of the abrasive particles 5. The baffle plate 19 suppresses the rising of the cavity.

The liquid level 7 is swung, and sometimes the liquid level 7 rises above the wall surface of the processing tank 11. Further, the cavitation jet collides with the workpiece 1 or the wall surface to be splashed out from above the processing tank 11. The first folded back 67 and the second folded back 69 changes the flow direction of the peening liquid 3 to splash out from above the processing tank 11, and returns it to the inside of the processing tank 11.

Second Embodiment

Figure 5:
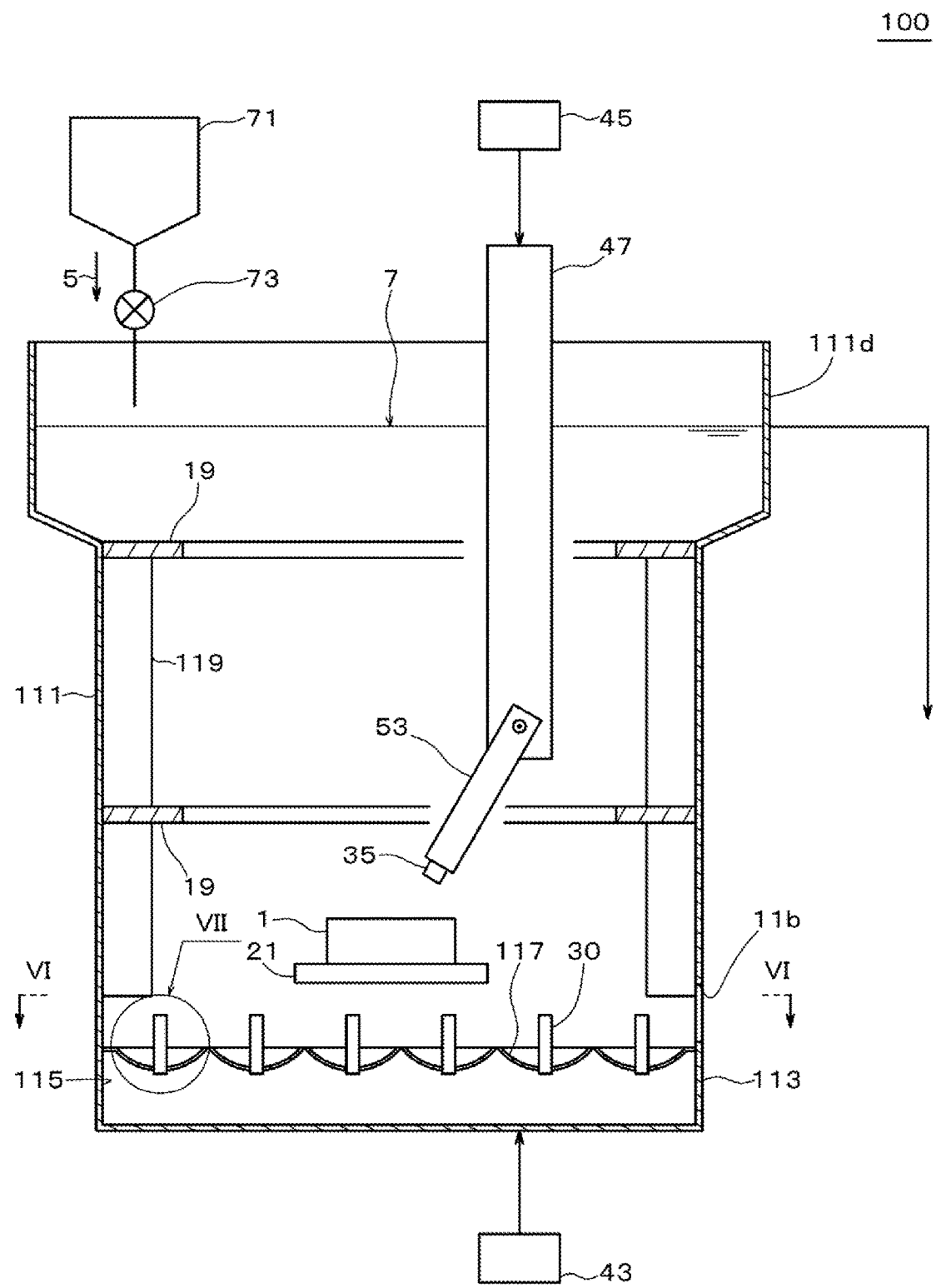
FIG. 5 is a longitudinal sectional view of an abrasive peening apparatus of a second embodiment.

As shown in FIG. 5, an abrasive peening apparatus 100 of the present embodiment includes a processing tank 111, a dispensing tank 113, and a vertical baffle plate 119.

The processing tank 111, which is a stepped cylindrical formed of a thin plate, has an upper opening and a lower opening. The processing tank 111 includes an enlarged portion 111d, and a drain port 11b. The enlarged portion 111d, which has a cylindrical shape, is disposed at an upper portion of the processing tank 111. The drain port 11b is disposed on a lower side wall of the processing tank 111.

Figure 6:
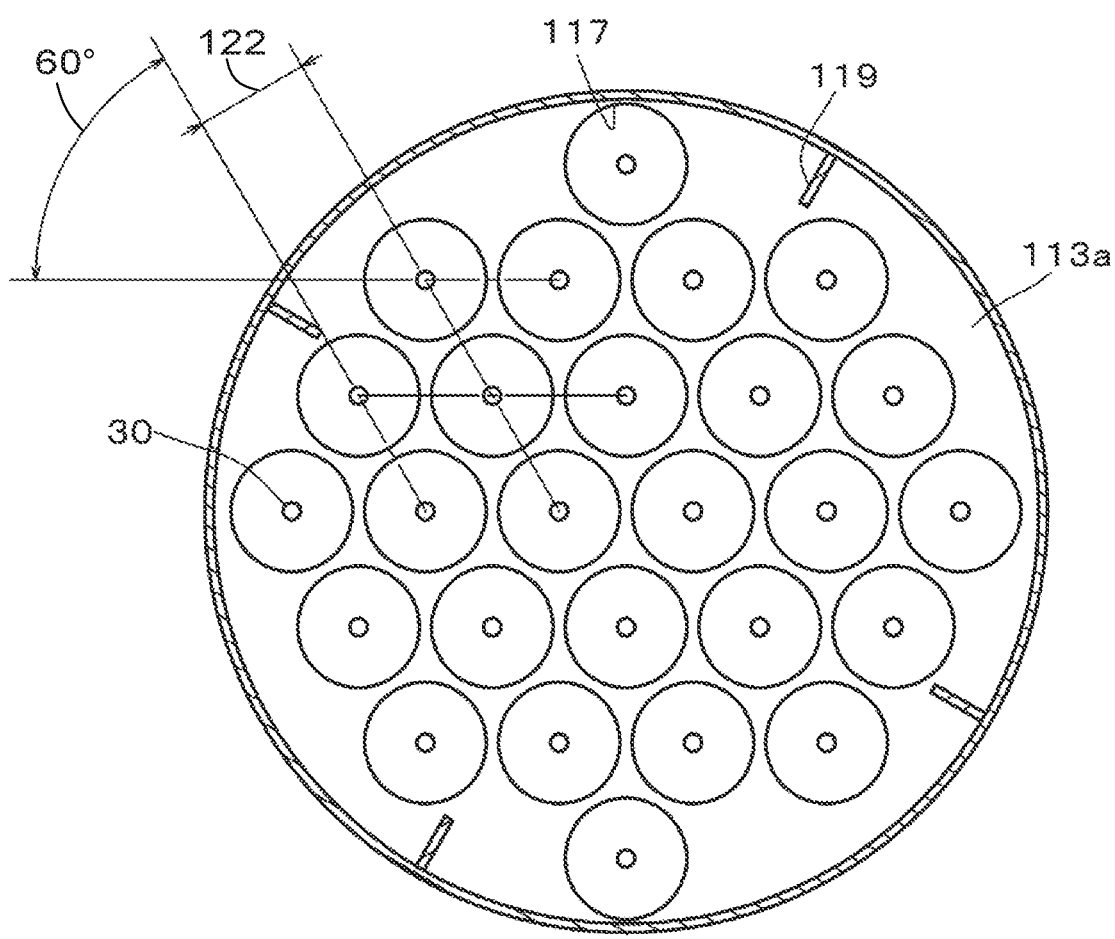
FIG. 6 is a cross-sectional view of VI-VI in FIG. 5.

As shown in FIGS. 5 and 6, the vertical baffle plate 119 extends in a vertical direction. A plurality of (four in the figure) vertical baffle plates 119 protrude radially from the inner wall of the processing tank 111. A plurality of (four in the figure) vertical baffle plates 119 are evenly disposed in the circumferential direction. The vertical baffle plate 119 is a flat plate. The vertical baffle plate 119 may have a through hole. The vertical baffle plate 119 may be a mesh. The vertical baffle plate 119 prevents the peening liquid 3 from flowing in the circumferential direction.

Figure 7:
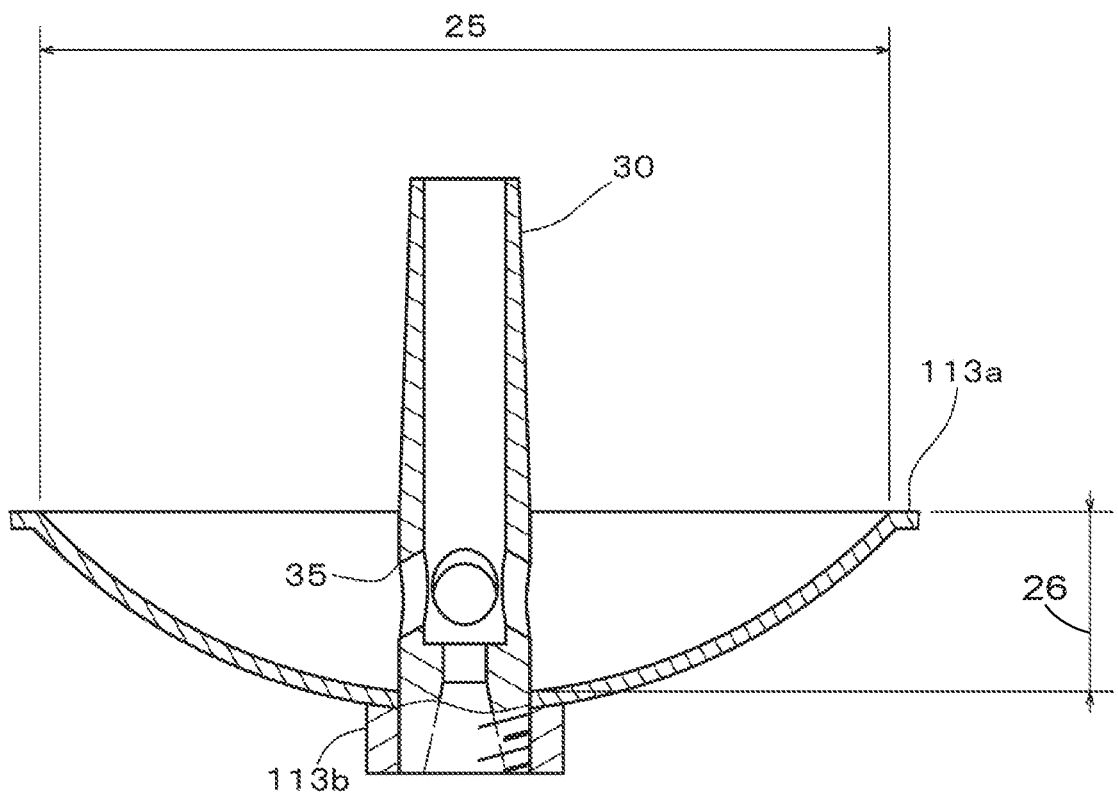
FIG. 7 is an enlarged view of part VII in FIG. 5.

The dispensing tank 113 includes a top plate 113a (see FIG. 7). The dispensing tank 113 is a hollow cylindrical shape formed of a thin plate. The dispensing tank 113 covers the lower opening of the processing tank 111. The top plate 113a separates the processing tank 111 and the dispensing tank 113. The inner space of the dispensing tank 113 is a dispensing chamber 115.

As shown in FIG. 6, a plurality of recesses 117 are uniformly arranged on the top plate 113a. The recess 117 has a spherical surface. As viewed from above, the plurality of recesses 117 are arranged at the positions of the vertices when an equilateral triangle having a length 122 on one side is laid. The recesses 117 may be closely packed. As shown in FIG. 7, the top plate 113a has a constant thickness even in the recess 117. For example, the top plate 113a is manufactured by pressing.

A stirring nozzle 30 is arranged in the center of the recess 117. A suction port 35 is disposed near the bottom surface of the recess 117.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

3 Peening liquid
Abrasive particle
10, 100 Abrasive peening apparatus
11, 111 Processing tank
15, 115 Dispensing chamber
17, 117 Recess
30 Stirring nozzle
47 Moving device
55 Peening nozzle

What is claimed is:

1. An abrasive peening apparatus for use in peening a workpiece using peening liquid in which abrasive particles are suspended, the abrasive peening apparatus comprising:
   a processing tank including a table in a bottom portion thereof on which a workpiece can be supported while immersed in the peening liquid;
   a dispensing chamber having a plurality of recesses on an upper surface thereof, the dispensing chamber disposed in the bottom portion of the processing tank and being configured to hold and dispense upwardly therefrom, toward the table, peening liquid contained therein;
   a stirring nozzle disposed at a center of each of the plurality of recesses and being directed vertically upward, with each of the stirring nozzles being in fluid communication with the dispensing chamber to receive and eject therefrom the peening liquid;
   a peening nozzle disposed inside the processing tank, the peening nozzle configured and arranged to eject the peening liquid toward the table; and
   a moving device configured to move the peening nozzle relative to the table,
   wherein each of the stirring nozzle includes
      a body extending upward,
      a peening liquid inlet located at a lower end of the body to receive peening liquid from the dispensing chamber,
      an internal outlet located inside the body, the internal outlet being in fluid communication with the peening liquid inlet,
      a stirring-nozzle outlet located at an upper end of the body,
      a passage connecting the internal outlet and the stirring-nozzle outlet, the passage extending vertically inside the body, and
      a radially oriented suction port located on an outer surface of the body and within the recess in which the stirring nozzle is disposed, the suction port being in fluid communication with a lower end of the passage so as to entrain abrasive particles from within the recess in which the given stirring nozzle is disposed into peening fluid flowing through the passage from the internal outlet to the stirring-nozzle outlet.

2. The abrasive peening apparatus according to claim 1, wherein each of the plurality of recesses has a larger diameter toward an upper direction.

3. The abrasive peening apparatus according to claim 1, wherein each of the plurality of recesses has a spherical shape.

4. The abrasive peening apparatus according to claim 1, wherein the plurality of recesses are uniformly disposed as viewed from above.

5. The abrasive peening apparatus according to claim 1, wherein the processing tank has a peening fluid maximum level and further comprises a baffle plate extending horizontally on an inner surface of the processing tank between the peening fluid maximum level and the table.

6. The abrasive peening apparatus according to claim 1, further comprising:
   a vertical baffle plate extending vertically on an inner surface of the processing tank inside the processing tank.

7. The abrasive peening apparatus according to claim 1, wherein the peening nozzle includes a flat spray nozzle, and a side wall surrounding the flat spray nozzle in a downstream of the flat spray nozzle.

8. The abrasive peening apparatus according to claim 1, further comprising:
   a drain port disposed in the bottom portion of the processing tank;
   a drain valve disposed outside the drain port to open or close the drain port; and
   a duct disposed outside the drain port and surrounding the drain valve.

9. The abrasive peening apparatus according to claim 1, further comprising:
   a first folded back extending horizontally at an upper end of the processing tank, and
   a second folded back extending downward at an inner side of the first folded back.

10. The abrasive peening apparatus according to claim 2, wherein each of the plurality of recesses has a spherical shape.

11. The abrasive peening apparatus according to claim 2, wherein the plurality of recesses are uniformly disposed as viewed from above.

12. The abrasive peening apparatus according to claim 3, wherein the plurality of recesses are uniformly disposed as viewed from above.

13. The abrasive peening apparatus according to claim 2, wherein the processing tank has a peening fluid maximum level and further comprises a baffle plate extending horizontally on an inner surface of the processing tank between the peening fluid maximum level and the table.

14. The abrasive peening apparatus according to claim 3, wherein the processing tank has a peening fluid maximum level and further comprises a baffle plate extending horizontally on an inner surface of the processing tank between the peening fluid maximum level and the table.

15. The abrasive peening apparatus according to claim 4, wherein the processing tank has a peening fluid maximum level and further comprises a baffle plate extending horizontally on an inner surface of the processing tank between the peening fluid maximum level and the table.

16. An abrasive peening method, comprising:
putting abrasive particles into a processing tank;
ejecting peening liquid from an internal outlet disposed inside of each of stirring nozzles, the stirring nozzles evenly arranged in a lower portion of the processing tank, the stirring nozzles each including
a body extending upward,
a peening liquid inlet located at a lower end of the body,
an internal outlet located inside the body, the internal outlet being in fluid communication with the peening liquid inlet,
a stirring-nozzle outlet located at an upper end of the body,
a passage connecting the internal outlet and the stirring-nozzle outlet, the passage extending vertically inside the body, and
a radially oriented suction port located on an outer surface of the body and within the recess in which the stirring nozzle is disposed, the suction port being in fluid communication with a lower end of the passage so as to entrain abrasive particles from within the recess in which the given stirring nozzle is disposed into peening fluid flowing through the passage from the internal outlet to the stirring-nozzle outlet,
sucking suspension of the peening liquid and the abrasive particles floating inside the recess around the stirring nozzle into the stirring nozzle;
blowing up the sucked suspension from the stirring-nozzle outlet toward inside the processing tank to float the abrasive particles;
ejecting the peening liquid from a peening nozzle immersed in the peening liquid that is stored in the processing tank toward a surface of a workpiece disposed in a bottom portion of the processing tank;
peening the surface of the workpiece with the abrasive particles on a flow of ejected peening liquid colliding with the workpiece; and
applying residual stress to the surface of the workpiece with cavity generated by the ejected peening liquid colliding with the workpiece.

* * * * *